Aug. 8, 1939.  E. R. BURSICK  2,168,728
TONGUE PROTECTOR AND EXTRACTOR THEREFOR
Filed Dec. 30, 1935
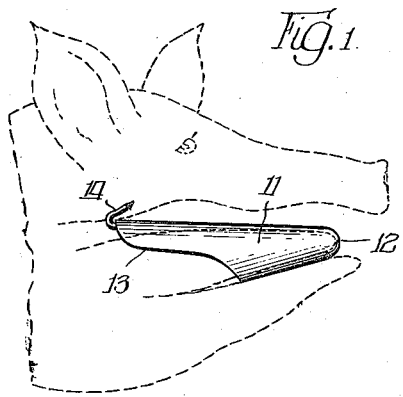
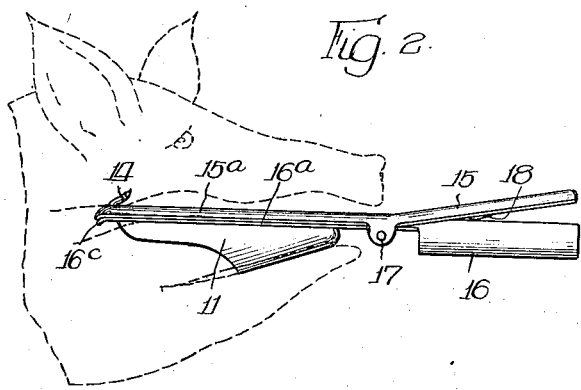
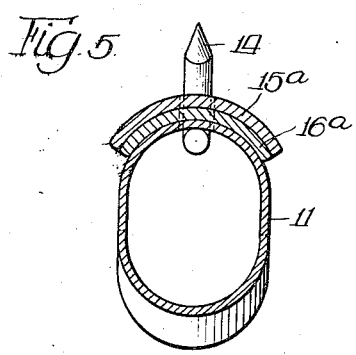
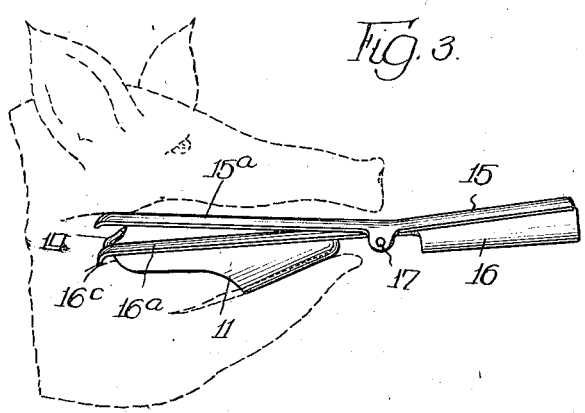
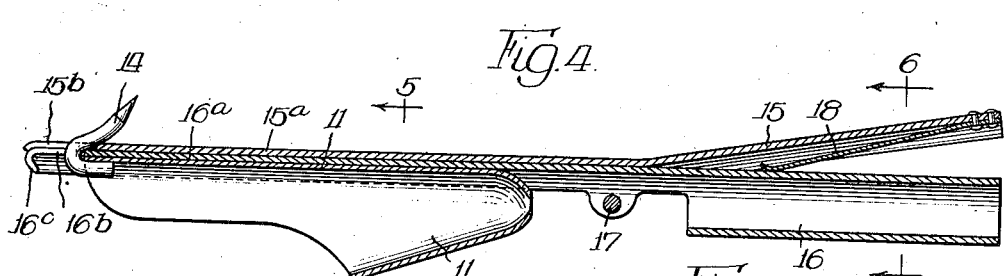
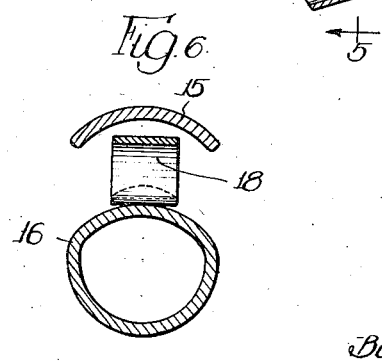
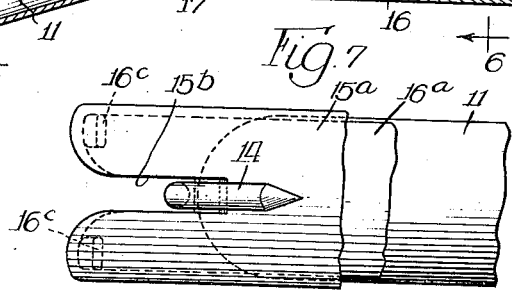
Inventor:
Edward R. Bursick,
By Cromwell, Greist & Warden
attys Patented Aug. 8, 1939

2,168,728

UNITED STATES PATENT OFFICE 2,168,728

TONGUE PROTECTOR AND EXTRACTOR THEREFOR

Edward Richard Bursick, Omaha, Nebr., assignor, by mesne assignments, to Industrial Patents Corporation, Chicago, Ill., a corporation of Delaware Application December 30, 1935, Serial No. 56,631

15 Claims. (Cl. 17—1)

In the butchering of animals which are not skinned, such as hogs, one of the necessary operations is the dehairing of the carcass by means of machines adapted to the purpose. Such machines include beater elements which in their action upon the head cause the jaws to open and close repeatedly. The tongue of the dead animal, hanging loosely in the mouth, is subjected to mutilation by the teeth in this champing action.

This tongue mutilation in some packing plants runs as high as 90%, with a general average of perhaps 15%. In some cases the damage is slight, but more often it is so extensive as to render the tongue a total loss as a food product.

The object of the present invention is the protection of the tongue from mutilation during the dehairing operation and to this end includes a two-part device comprising a tongue protector and a remover or extractor therefor. The protector element may readily be inserted by hand but for the removal of the same after the dehairing operation an extractor tool is found to be advantageous.

The protector of metal shaped somewhat like a finger stall is slipped over and about the tongue of the animal in the scalding tank before the hog enters the dehairing machine and is removed therefrom after the dehairing operation and returned to the scalding tank for further use. One extractor tool is sufficient for the successive removal of a large number of protectors but, by reason of its structural adaptation to the tongue protectors, the two devices constitute dependent parts of a single invention.

As an exemplification of the invention and to facilitate an understanding of the operation thereof, the following detailed description is to be taken in connection with the accompanying illustrative drawing.

Figure 1 represents the protector in position upon the tongue of a hog.

Figure 2 represents the extracting tool inserted upon the protector in readiness for removing the same.

Figure 3 represents the protector and extractor in process of removal.

Figure 4 is a longitudinal vertical section through the protector and extractor in the positions occupied at the beginning of the extracting operation.

Figure 5 is a transverse section on the line 5—5 of Figure 4.

Figure 6 is a transverse section on the line 6—6 of Figure 4.

Figure 7 is a fragmentary detail of the left hand end of Figure 4 in top plan.

As will be readily understood from the drawing the tongue protector 11 is formed of sheet metal folded into shape resembling the thumb portion of a glove having a reduced forward end at 12 and enlarging towards the rear, where it is open, as indicated at 13. The upper part of the rear end is provided with a hook or spur 14 rigidly affixed to or integral with the body of the protector.

The protector 11 is arranged to be slipped over the tongue of the animal, being inserted by hand or by the tool hereinafter described, into the position indicated in Figures 1, 2 and 3, where the spur hook 14 engages in the mouth wall, preferably the nasal cavity in the roof of the mouth. Here it is held firmly against possibility of accidental dislodgment.

The protector having been inserted when the carcass is at the scalding tank, it remains in position while the body is subjected to the beating action of the dehairing apparatus, effectually protecting the tongue from mutilation by the teeth. Thereafter an operator removes the protector from the mouth in the manner and by the tool which will now be described.

The extractor tool comprises two members 15 and 16 pivoted intermediate their length at 17 and provided with a spring 18 normally holding apart the handle portions of the two members, as shown in Figure 4, with the blades 15a and 16a in contacting relation. The blades 15a and 16a are downwardly concave to fit upon and about the upwardly convex surface of the protector 11 and the handle of the member 15 is likewise concave downwardly to fit the handle of the member 16, which is cylindrical. Both the blades 15a and 16a are longitudinally notched at their extremities, as indicated at 15b and 16b, to embrace the hook 14 of the protector and the blade 16a terminates in hooks 16c, as best shown in Figures 4 and 7, for a purpose which will be made clear.

When the tongue protector is to be removed by the extractor the latter is inserted, as indicated in Figure 2, the shank of the hook 14 being embraced within the notches 15b and 16b as best shown in Figure 4. The extractor is then thrust towards the rear and simultaneously the handle members 15 and 16 are pressed together, thereby separating the blades 15a and 16a, as indicated in Figure 3, thus concurrently forcing the spur 14 rearwardly and downwardly out of engagement with the upper jaw. While the blades are thus held in the separated position shown in Figure 3, the forward pull upon the extractor causes the hooks 16c to engage the rear end of the protector and to draw the same from the mouth, thus freeing the tongue.

Obviously mechanical changes may be made in the structural details of the protector and the extractor without departure from the essence of the invention as set forth herein.

I claim:

1. In a device of the class described, a tongue protector for covering and protecting against teeth slashing the tongue of an animal carcass, a spur for holding the protector in place connected directly to said protector and adapted when the latter is in its normal position to extend upwardly and engage the portion of the roof of the mouth directly above the tongue.

2. In a device of the class described, a tongue protector for enveloping the tongue and provided with means for securing the same in place against accidental dislodgment, said protector comprising a hollow conical metallic member open at its larger end to receive the tongue adjacent its base and the securing means comprising a laterally projecting hook-like spur having fixed relation with the rear end of the protector and adapted to engage within the nasal cavity in the roof of the mouth.

3. In a device of the class described, the combination with a tongue protector for enveloping and holding the tongue against injury and means for securing said protector in place against accidental dislodgment comprising a spur carried by the protector for engaging a wall of the mouth, of an extractor therefor comprising means for pressing the protector away from the spur engaged portion of the mouth to release the spur from the mouth and to engage the protector to effect removal of the same after use.

4. In a device of the class described, the combination with a tongue protector for enveloping and holding the tongue against injury and means for securing said protector in place against accidental dislodgment comprising a spur carried by the protector for engaging a wall of the mouth, of an extractor therefor comprising hinged blade-like members adapted to overlie the protector and terminally slotted to embrace the spur and provided with handles whereby to separate the members and thereby force the spur downwardly and release the same from engagement.

5. In a device of the class described, the combination with a tongue protector for enveloping and holding the tongue against injury and means for securing said protector in place against accidental dislodgment comprising a spur carried by the protector for engaging a wall of the mouth, of an extractor therefor comprising hinged blade-like members adapted to overlie the protector and terminally slotted to embrace the spur and provided with handles whereby to separate the members and thereby force the spur downwardly and release the same from engagement, said extractor also being provided with downwardly projecting terminal hooks for engaging the rear end of the protector to effect withdrawal of the released protector from the mouth.

6. In a device of the class described, a tongue protector for enveloping the tongue and provided with means for securing the same in place against accidental dislodgment, said protector comprising a rigid sheath-like member with open rear end to receive the tongue adjacent its base and the securing means comprising an upstanding spur adapted in response to upward movement of the member to penetrate the roof of the mouth and thus secure the member against accidental dislodgment.

7. A device of the class described comprising a member for covering, and protecting against teeth slashing, the tongue of an animal carcass, and an upstanding spur connected directly to the member and adapted in response to upward shift thereof to penetrate the roof of the mouth of the carcass directly above the tongue and hold the member against accidental dislodgment.

8. A protector for the tongue of an animal carcass, consisting of but two parts, one part thereof being the sole means for covering and protecting the tongue and the other part thereof being the sole means for securing the protector to another part of the mouth interior by penetration of the flesh portion thereof and holding the one part in assembled position with respect to the tongue.

9. A protector for the tongue of an animal carcass, comprising a member having greater length than width, greater heighth than width, and forming a partial enclosure for the tongue, and having smooth inner and outer surfaces, and means extending upwardly from the member when the latter is in its normal position on the tongue, and adapted to secure the protector to the roof of the mouth of the carcass by penetration of the flesh portion thereof and hold the member in place.

10. A device for protecting the tongue of an animal carcass against mutilation during treatment of the carcass, comprising a body member shaped to envelop the tongue, and a spur connected fixedly and directly to the member and having a pointed extremity adapted when the member is in its operative position to engage the interior of the mouth of the carcass in such manner as to hold the member against accidental dislodgment.

11. A device for protecting the tongue of an animal carcass against mutilation or teeth slashing during treatment of the carcass, comprising an elongated curved body member adapted to envelop the tongue, and a spur connected fixedly and directly to one end of the member and having a substantially rigid pointed extremity adapted when the member is in its operative position to embed itself in the fleshy portion of the interior of the mouth of the carcass in such manner as to hold the member against accidental dislodgment.

12. A device for protecting the tongue of an animal carcass against mutilation during treatment of the carcass, comprising an elongated curved body member adapted to overlie and envelop the tongue, and means for securing the body member against accidental displacement when it is in its operative position comprising a spur having a shank part connected at one end thereof to, and formed integrally with, the inner end of the body member, and a pointed part formed integrally with and extending at an angle from the other end of the shank part and adapted for embedment in the fleshy part of the interior of the mouth of the carcass.

13. An animal carcass tongue protector adapted to envelop the tongue and shaped such that when secured wholly within the mouth of the carcass the jaws of the carcass may be completely closed.

14. An animal carcass tongue protector comprising a tapered guard adapted to be secured wholly within the mouth of the carcass and to permit normal closing of the jaws.

15. The method of protecting an animal carcass tongue from mutilation which comprises enveloping the tongue with a guard which is secured wholly within the mouth of the carcass and which permits normal closing of the jaws.

EDWARD RICHARD BURSICK.